United States Patent
Danneberg et al.

(10) Patent No.: US 12,043,103 B2
(45) Date of Patent: Jul. 23, 2024

(54) STORED ENERGY SOURCE FOR A MOTOR VEHICLE

(71) Applicant: Bayerische Motoren Werke Aktiengesellschaft, Munich (DE)

(72) Inventors: Jan Danneberg, Munich (DE); Roland Wanka, Buch am Erlbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 294 days.

(21) Appl. No.: 17/593,779

(22) PCT Filed: Feb. 28, 2020

(86) PCT No.: PCT/EP2020/055294
§ 371 (c)(1),
(2) Date: Sep. 24, 2021

(87) PCT Pub. No.: WO2020/193076
PCT Pub. Date: Oct. 1, 2020

(65) Prior Publication Data
US 2022/0176791 A1  Jun. 9, 2022

(30) Foreign Application Priority Data
Mar. 25, 2019  (DE) .................. 10 2019 107 504.1

(51) Int. Cl.
*B60K 1/04* (2019.01)
(52) U.S. Cl.
CPC ........ *B60K 1/04* (2013.01); *B60K 2001/0438* (2013.01)

(58) Field of Classification Search
CPC ..... B60K 2001/0438; B60K 1/04; B60K 1/00
(Continued)

(56) References Cited

U.S. PATENT DOCUMENTS

| | | | |
|---|---|---|---|
| 5,558,949 A | * | 9/1996 | Iwatsuki ............. H01M 10/617 180/68.5 |
| 10,870,340 B2 | * | 12/2020 | Acikgoez ............... B60R 16/04 |

(Continued)

FOREIGN PATENT DOCUMENTS

| CN | 102325664 A | 1/2012 |
|---|---|---|
| CN | 103702893 A | 4/2014 |

(Continued)

OTHER PUBLICATIONS

International Search Report (PCT/ISA/210) issued in PCT Application No. PCT/EP2020/055294 dated May 26, 2020 with English translation (four (4) pages).

(Continued)

*Primary Examiner* — James A Shriver, II
*Assistant Examiner* — Hilary L Johns
(74) *Attorney, Agent, or Firm* — Crowell & Moring LLP (57) ABSTRACT

A stored energy source for a motor vehicle has a bottom plate, by which battery modules in question are at least indirectly supported and by which the stored energy source is delimited at the bottom. In order to provide a stored energy source that is optimized with respect to its behavior during an accident and with respect to the vehicle package and does not require any installation space in the interior of the motor vehicle, the stored energy source has at least one line, which runs above the bottom plate and exits the stored energy source at a front and a rear end.

10 Claims, 5 Drawing Sheets

(58) Field of Classification Search
USPC .................................................... 180/68.5
See application file for complete search history.

(56) References Cited

U.S. PATENT DOCUMENTS

| | | | | |
|---|---|---|---|---|
| 2011/0300426 | A1 | 12/2011 | Iwasa et al. | |
| 2014/0117716 | A1* | 5/2014 | Patberg | B62D 21/15 |
| | | | | 296/187.08 |
| 2017/0305249 | A1* | 10/2017 | Hara | B62D 25/2036 |
| 2017/0313170 | A1* | 11/2017 | Hara | B60L 50/66 |
| 2018/0281577 | A1* | 10/2018 | Acikgoez | H01M 50/24 |
| 2018/0370577 | A1* | 12/2018 | Takahashi | B60K 1/04 |
| 2019/0061506 | A1 | 2/2019 | Kappich | |

FOREIGN PATENT DOCUMENTS

| | | |
|---|---|---|
| CN | 107379949 A | 11/2017 |
| CN | 107415671 A | 12/2017 |
| CN | 109094663 A | 12/2018 |
| CN | 109421504 A | 3/2019 |
| DE | 10 2011 051 698 A1 | 1/2013 |
| DE | 10 2015 003 643 B3 | 6/2016 |
| DE | 10 2017 206 566 A1 | 10/2017 |
| DE | 10 2017 206 852 A1 | 11/2017 |
| EP | 2 463 162 A2 | 6/2012 |
| EP | 2 468 609 A2 | 6/2012 |
| EP | 2 555 277 A1 | 2/2013 |

OTHER PUBLICATIONS

German-language Written Opinion (PCT/ISA/237) issued in PCT Application No. PCT/EP2020/055294 dated May 26, 2020 (six (6) pages).

German-language Search Report issued in German Application No. 10 2019 107 504.1 dated Mar. 6, 2020 with partial English translation (10 pages).

English translation of Chinese-language Office Action issued in Chinese Application No. 202080021337.4 dated Nov. 28, 2023 (8 pages).

* cited by examiner

STORED ENERGY SOURCE FOR A MOTOR VEHICLE

BACKGROUND AND SUMMARY OF THE INVENTION

The invention relates to an energy store for a motor vehicle with a bottom panel, by way of which respective battery modules are supported at least indirectly, and by way of which bottom panel the energy store is delimited toward the bottom.

An energy store of this type, which is inserted into a floor assembly, is already known from EP 2 468 609 A2, in the case of which a vehicle floor of the floor assembly is delimited laterally by way of respective side sills and is reinforced by way of longitudinal carriers and/or crossmembers. Here, the energy store is formed by way of a housing, within which the respective battery cells or battery modules are received. This housing is reinforced by way of a frame-like construction of profile elements which run around on the outer peripheral side and a plurality of crossmembers, with the result that the energy store can be fastened on the lower side of the vehicle floor via respective screw connections, in particular in the region of the side sills. In order to obtain as favorable a transmission of force as possible between the energy store and the floor assembly, the size and shape of the energy store are adapted to the opening which is formed on the lower side of the vehicle floor by way of the side sills and the respective crossmembers. Accordingly, the housing of the energy store can be positioned and fastened at least in a substantially positively locking manner between the respective side sills. As a result, the energy store serves as a load-bearing element of the floor assembly in terms of the shell construction.

Although the load-bearing function of the housing of the energy store makes a relatively rigid compound structure between the energy store and the floor assembly possible, it is extremely complicated to produce and, in addition, is heavy as a result of the load-bearing function of the housing of the energy store. Thus, for example, forces which are introduced in the case of a side impact also have to be absorbed by way of the housing of the energy store, as a result of which this housing has to be of correspondingly rigid and stable configuration. In addition, double process chains result between the energy store and the remaining components of the floor assembly, since they act jointly as a compound structure. A further problem is in the load transfer points in the region of the screws, via which the energy store is fastened to the respective side sill. In particular, in the case of an accident-induced loading of force, these load transfer points are extremely at risk of a failure, with the result that considerable measures have to be taken in order to avoid this. In addition, the respective load paths are interrupted by way of the transition between the energy store and the floor assembly, which can likewise prove disadvantageous with regard to a transmission of force, in particular in the case of an accident.

In addition, a multiplicity of lines are usually required which have to be laid between a region in front of the energy store and a region behind the energy store. To this end, what is known as a stub tunnel has usually been provided up to now, which stub tunnel extends in the vehicle longitudinal direction and weakens the energy store in a central region. By way of this stub tunnel, for example, corresponding load paths for a side impact are interrupted in the region of the seat crossmembers and, moreover, installation space which can otherwise be added to the interior compartment of the vehicle is required. Other line routing means are also problematic and either reduce the installation space of the energy store or else lead to problems in the case of the vehicle package.

Therefore, it is an object of the present invention to provide an energy store of the type mentioned at the outset, by means of which the accident behavior of the motor vehicle can be improved and problems with regard to the installation space in the interior compartment of the motor vehicle and in the vehicle packaging can be reduced.

According to the invention, this object is achieved by way of an energy store with the features of the independent claim. Favorable developments are the subject matter of the dependent claims.

The energy store according to the invention is assigned a bottom panel, by way of which respective battery modules are supported at least indirectly, and by way of which the energy store is delimited toward the bottom. In order to then obtain a particularly favorable energy store with regard to its accident behavior, by way of which, moreover, a particularly large interior compartment of the motor vehicle can be provided and problems in the case of the vehicle packaging can be avoided, it is provided according to the invention that the energy store comprises at least one line which runs above the bottom panel and exits at a front and a rear end from the energy store.

The laying according to the invention of the at least one line within the energy store and, in particular, above the bottom panel therefore firstly takes into consideration the circumstance of avoiding a stub tunnel or the like which impairs, in particular, the corresponding side crash load paths in the region of the energy store, and secondly makes it possible that the bottom panel runs continuously and completely below the energy store. In addition, the laying of the line within the energy store achieves a situation where laying, for example, in the interior compartment of the motor vehicle can be dispensed with, in order to avoid installation problems and vehicle packaging problems in this way.

In a further refinement of the invention, it has been shown here to be advantageous if the energy store is delimited toward the top by way of a vehicle floor and at the front and rear end by way of a respective crossmember. In other words, the bottom panel therefore forms a type of laterally open or closed overall housing of the energy store, with the result that the latter is accommodated in a particularly safe manner. Here, the energy store can adjoin the respective crossmembers, and the line can penetrate these crossmembers in the region of respective openings. As a result, particularly favorable line laying is possible.

In a further refinement of the invention, the energy store is assigned at least one additional longitudinal carrier or crossmember which is arranged on the upper side of the vehicle floor for the reinforcement of the floor assembly. Accordingly, it is possible to bring about a division between the receiving and sealing function of the energy store firstly and the reinforcing function which has likewise been performed in the prior art up to now by way of the housing of the energy store. Here, the at least one additional crossmember preferably extends continuously between the respective side sills, to which it is connected in each case.

In this context, it has been shown to be advantageous, furthermore, if the energy store comprises at least one individual housing for respective battery modules, which individual housing is non-load-bearing in terms of the shell construction and is supported by way of the bottom panel. Accordingly, it is provided for the at least one individual housing of the energy store to be designed without frame elements, a profile or the like which contribute to the reinforcement of the floor assembly or the motor vehicle shell construction and to absorbing of accident energy in the case of corresponding accident-induced force loading. Rather, the function of the individual housing of the energy store is revealed, in particular, in receiving the respective battery cells or battery modules in a sealed manner.

Since the at least one individual housing of the energy store is therefore configured without load-bearing elements of the floor assembly, it can be of considerably less expensive design. Moreover, optimized load paths in the floor assembly or the motor vehicle shell construction can be provided by way of the respective longitudinal carriers or crossmembers which, as a consequence of the omission of respective carriers in the region of the energy store, are additionally arranged on the side of the vehicle floor, without corresponding load transfer points such as screws or the like being required here. Therefore, not only is a solution provided which is more favorable and simpler in terms of manufacturing technology, but rather, moreover, an improved rigidity and stability of the floor assembly can also be achieved.

In a further refinement of the invention, a plurality of individual housings of the energy store which run parallel to one another are provided. They can advantageously run parallel to one another in the vehicle transverse direction. It is particularly advantageous, however, if the plurality of individual housings run parallel to one another in the vehicle longitudinal direction, since, according to experience, they can then be of longer and larger configuration, with the result that cost advantages can be realized overall. A plurality of individual housings have the advantage, in addition, that their attachment to the vehicle floor is far simpler than in the case of one large individual housing, in the case of which a central attachment has to be provided which can usually be brought about only with considerable technical complexity.

In a further advantageous refinement of the invention, in each case one retaining profile is arranged on the lower side of the vehicle floor to the side of the respective individual housing, via which retaining profile the respective individual housing is connected to the vehicle floor. An arrangement of this type of housings and retaining profiles which are arranged between them or on their sides makes particularly favorable and simple fixing of the respective individual housings on the lower side of the vehicle floor possible.

Furthermore, it has been shown to be advantageous if the respective housing is clamped between the respective retaining profile and the bottom panel, in particular by means of a clamping strip. This results in fixing of the respective housing on the lower side of the vehicle floor, which fixing is of large format and is particularly favorable with regard to tolerance compensation.

In a further refinement of the invention, it has been shown to be advantageous if the line is received in a continuous line duct. The latter can possibly be of open or closed configuration. By way of a continuous line duct of this type, the respective line is protected particularly favorably against damage.

As an alternative to this, however, it is also contemplated for the line to be arranged on holders which are spaced apart from one another. This is a particularly simple possibility for fixing the respective line.

A further advantageous embodiment of the invention provides that the line is fastened at least indirectly to the bottom panel. This can take place either by way of a continuous line duct or by means of holders which are spaced apart from one another.

Further features of the invention result from the claims, the figures and the description of the figures. The features and combinations of features mentioned above in the description and the features and combinations of features mentioned below in the description of the figures and/or shown solely in the figures can be used not only in the respective specified combination, but rather also in other combinations or on their own.

The invention will now be described in greater detail on the basis of one preferred exemplary embodiment and with reference to the drawings.

DETAILED DESCRIPTION OF THE DRAWINGS

Figure 1:
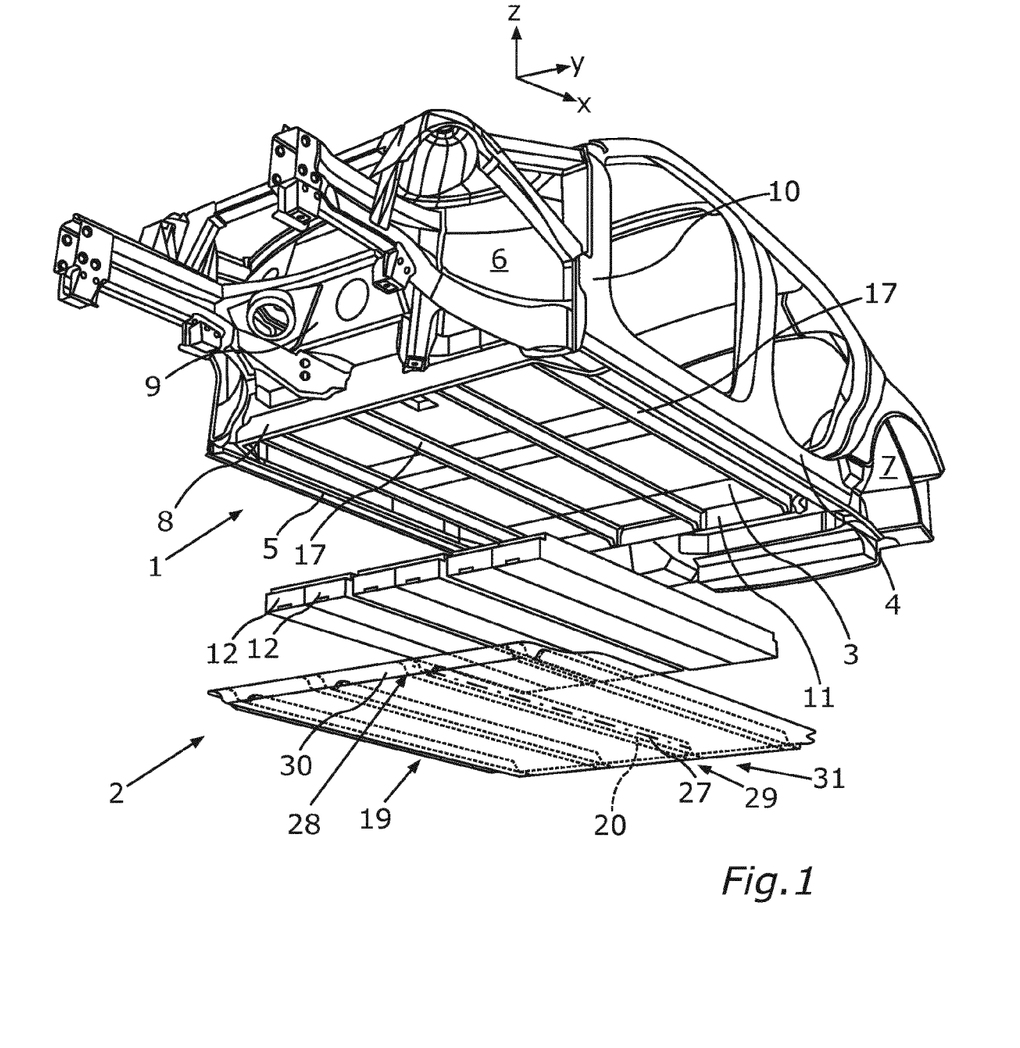
FIG. 1 is a perspective exploded illustration of a floor assembly of a motor vehicle body, in the case of which a vehicle floor is delimited laterally by way of respective side sills and is reinforced by way of longitudinal carriers and/or crossmembers, and in the case of which an energy store is delimited on the upper side by way of the vehicle floor and on the lower side by way of a bottom panel, and comprises a plurality of housings which extend in the vehicle longitudinal direction and are of non-load-bearing configuration in terms of the shell construction.

FIG. 1 is a perspective exploded illustration of a motor vehicle shell construction of a passenger motor car with a floor assembly 1 and an energy store 2. The energy store 2 is formed here in part by way of the floor assembly 1 and by way of a bottom panel 19. A drive of the motor vehicle which is driven, for example, in a fully electric manner or by means of a hybrid drive can be supplied with electric energy by means of the energy store 2.

The floor assembly 1 is substantially formed by way of a vehicle floor 3 which is as largely as possible planar here and is formed, in particular, from one or a plurality of formed sheet metal components. This vehicle floor 3 is delimited laterally by way of respective side sills 4, 5 which run substantially horizontally in the vehicle longitudinal direction between respective front and rear wheel arches 6, 7 of each vehicle side. In the front region, the floor assembly 1 is delimited toward the front by way of a front crossmember 8 which, in relation to the vehicle longitudinal direction, runs at the level of a bulkhead 9 which separates the passenger compartment from the front structure of the motor vehicle. Here, the crossmember 8 runs horizontally and in the vehicle transverse direction between respective front ends of the side sills 4, 5 or lower ends of corresponding front door pillars 10. In a rear region, the floor assembly 1 has a rear crossmember 11 which extends horizontally and in the vehicle transverse direction, in relation to the vehicle longitudinal direction, approximately at the level of respective rear ends of the side sills 4, 5.

The vehicle floor 3 with the side sills 4, 5 and the crossmembers 8, 11 forms a recess which is open toward the bottom and in which the energy store 2 is arranged below the vehicle floor 3 in a way which will be described in greater detail in the further text.

Here, the arrangement of the energy store 2 below the vehicle floor 3 is to be explained in the further text on the basis of FIGS. 2 and 3 which show a perspective view and a sectional view from the front in each case along the sectional plane which runs in the vehicle transverse direction and in the vehicle vertical direction of the floor assembly 1, the bottom panel 19 and the energy store 2 which is formed here in part by way of the floor assembly 1 and the bottom panel 19.

It first of all becomes clear here that the energy store 2 comprises a plurality of (in the present case, six) single individual housings 12 which are connected to one another in each case from an upper part 13 which is substantially U-shaped in cross section and a lower part 14 which is likewise substantially U-shaped in cross section, along a respective flange connection 15. Here, the flange connection 15 is formed by way of respective flanges of the upper part 13 and the lower part 14, and runs on the outer peripheral side in a peripherally closed manner around the respective entire individual housing 12. As a result, battery cells or battery modules 16 which are arranged within the respective individual housing 12 are received in a sealed manner within the respective associated housing 12.

Here, the plurality of individual housings 12 extend parallel to one another approximately horizontally and in the vehicle longitudinal direction. In each case one retaining profile 17 runs horizontally and in the vehicle longitudinal direction to the side of each of the individual housings 12 or between the single individual housings 12, which retaining profile 17 has substantially a top-hat profile in cross section here and is fixed by means of respective flanges 18 on the lower side of the vehicle floor 3, for example via a welded connection or some other type of joint. Here, the retaining profiles 17 can also be seen, in particular, in FIG. 1 on the lower side of the vehicle floor 3. They serve primarily to secure the housings 12. Accordingly, the retaining profiles 17 are also arranged outside the energy store 2.

A bottom panel 19 in the form of a load-bearing panel can be seen, in particular, in FIG. 1, which bottom panel 19 can be configured, for example, as a formed sheet metal part, as a plastic component or as a cast metal component. In the present case, the bottom panel 19 is of substantially planar configuration and, on the upper side, has respective clamping strips 20 which are of double T-shaped design in the respective central region between the individual housings 12 and of box section-like design in cross section on the outer side of the outermost housing 12. These clamping strips 20 are fastened, for example, via a welded connection, another joint or the like on the upper side or inner side of the bottom panel 19, and are flush with the respective corresponding retaining profile 17 which for its part is fastened to the underside of the vehicle floor 3. Accordingly, the respective clamping strips 20 also run at least substantially horizontally and in the vehicle longitudinal direction when the load-bearing element 19 is mounted on the floor assembly 1.

During mounting, the bottom panel 19 with the clamping strips 20 is fitted with the individual housings 12 and is subsequently fastened to the lower side of the vehicle floor 3. Here, the housings 12 are clamped by way of their respective flange connections 15 between the respective retaining profile 17 and the respective clamping strip 20, by the bottom panel 19 being fastened to the lower side of the vehicle floor 3. This takes place primarily by virtue of the fact that corresponding screw connections 26 (FIG. 3) or other mechanical connecting means are set between the bottom panel 19 or the respective clamping strip 20 and the associated retaining profile 17, with the result that the respective flange connection 15 of the corresponding housing 12 is clamped between the respective retaining profile 17 and the associated clamping strip 20.

The bottom panel 19 serves not only for mounting and securing of the respective housings 12, but also for protecting them. In particular, when driving over a bollard, the respective housings 12 are therefore protected in an optimum way against damage.

Figure 2:
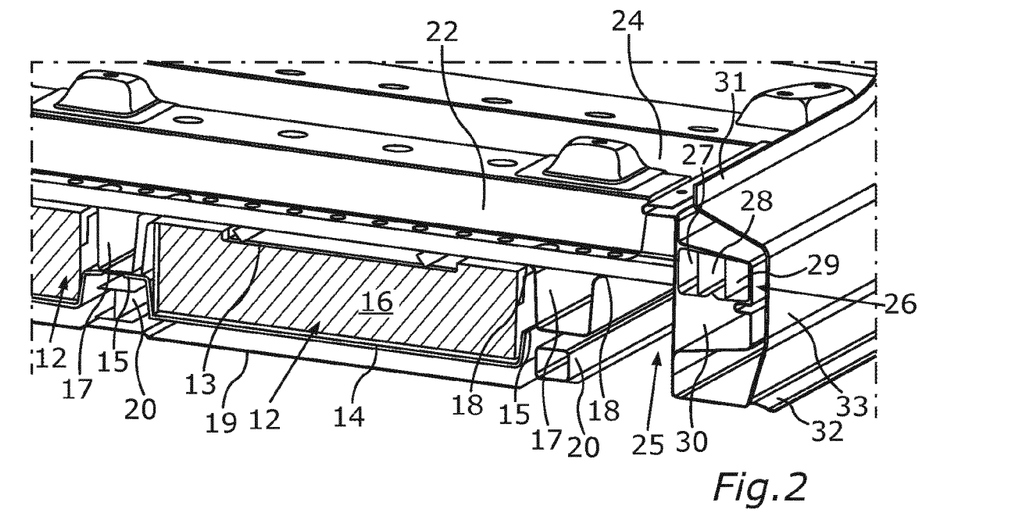
FIG. 2 is a perspective sectional view through the floor assembly with the energy store and the bottom panel according to FIG. 1 along the sectional plane which runs in the vehicle vertical direction and in the vehicle transverse direction.
Figure 3:
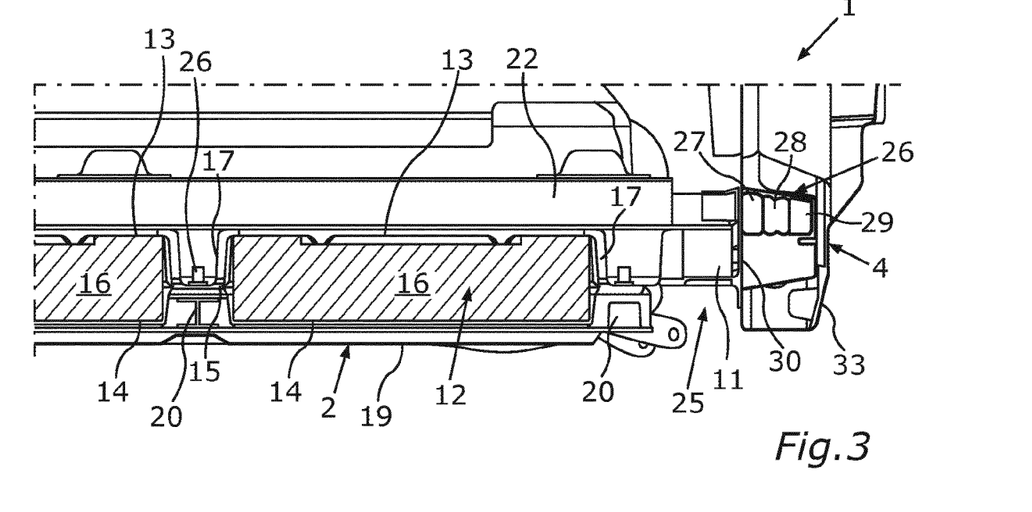
FIG. 3 shows details of a sectional view through the floor assembly with the energy store and the bottom panel according to FIGS. 1 and 2 along the sectional plane which runs in the vehicle transverse direction and vehicle vertical direction.

In addition, it can be seen, in particular from FIGS. 2 and 3, that both the respective housings 12 and the bottom panel 19 end at a lateral spacing from the respective corresponding side sill 4, 5. In other words, a clearance 25 which extends upward as far as the lower side of the vehicle floor 3 is provided between the energy store 2 and the respective side sill 4, 5. Accordingly, there is substantially no connection between the energy store 2 and the respective side sill 4, 5 below the vehicle floor 3.

Moreover, it can be seen, in particular from FIGS. 2 and 3, that the respective housing 12 with the respective upper parts 13 and lower parts 14 is configured substantially without a load-bearing structure. This means, in particular, that no carriers or carrier-like depressions are provided which would contribute, in particular, to the reinforcement of the vehicle body in the vehicle transverse direction. In contrast to the previous prior art, no frame which runs around the energy store is likewise provided, via which frame this energy store might be attached, for example, to the side sills 4, 5. Respective spacings between the respective housings 12 and the corresponding crossmember 8 or 11 can also be provided in the vehicle longitudinal direction toward the front and toward the rear. This applies likewise to the bottom panel 19 which can possibly likewise end at a spacing from these crossmembers 8, 11.

Since, although the energy store 2 and, in particular, its housing 12 therefore have a sealing function for the battery modules 16 which are arranged within it, they do not have, in particular, any reinforcing and load-bearing properties for the motor vehicle shell, additional reinforcement of the floor assembly 1 takes place. Rather, in addition to respective seat crossmembers, further crossmembers 22, 24 are provided in the present case for this purpose, which further crossmembers 22, 24 have not been required up to now in the case of conventional floor assemblies with energy stores. Since the respective individual housings 12 do not namely have any load-bearing and reinforcing function for the motor vehicle shell and/or the floor assembly 1, this is brought about by way of the crossmembers 22, 24 which run on the upper side of the vehicle floor 3 and are fixed to its upper side. Here, the crossmembers 22, 24 extend over the complete width of the floor assembly between the two side sills 4, 5, on which they are supported and to which they are also fastened. This results in two optimum load paths between the respective side sills 4, 5, without, as in the case of the previous prior art, it being necessary for the circuitous route via corresponding load transfer points in the form of screws or the like to be selected, at which load transfer points the load would be transferred from the floor assembly and/or the motor vehicle shell, in particular from the side sills 4, 5, to the energy store 2 and its housing 12.

It can be seen here that load paths are produced in this way which are produced in a simple way by means of the respective crossmembers 22, 24, and can be welded in a simple way and accordingly are not only attached in a punctiform manner. A further great advantage of this design is, in addition, that the described separation of functions between the seal of the respective individual housings 12 and the mechanical reinforcement of the floor assembly 1 and/or the motor vehicle shell is separated functionally. As a result, in particular, the respective individual housing 12 and the energy store 2 overall can be produced in a considerably less expensive manner and, moreover, an improved function of the motor vehicle shell and its floor assembly 1 can be achieved.

It is a further advantage that a spacing or clearance 25 is provided between the side sills 4, 5 and the energy store 3, in particular its housing 12, which is possible only because the respective housing 12 or the energy store 2 overall does not have to contribute to the reinforcement of the floor assembly 1 and accordingly does not necessarily have to be fastened to the respective side sill 4, 5. This has the advantage, in particular, that, in the case of a side impact on one of the side sills 4, 5, there is a considerable distance from the energy store 2 or the respective housing 12, with the result that damage of the energy store 2 arises much later in the course of the accident scenarios in the case of a side impact.

Since the energy store 2 is formed by a plurality of individual housings 12 which do not have to be connected among one another on account of their non-load-bearing function, an extremely complicated central attachment which has been required up to now of the energy store 2 can be dispensed with. Rather, the individual housings 12 can be held in an optimum manner in the underfloor region, in particular, by way of the combination of the bottom panel 19 with the retaining profiles 17 and the clamping strips 20.

In addition, the bottom panel 19 and the vehicle floor 3 form a type of laterally open overall housing of the energy store 2, in which overall housing the individual housings 12 are accommodated safely. In addition, it would of course also be conceivable for the bottom panel 19 and the vehicle floor 3 to be connected to one another in a peripherally sealed manner, in order to produce a sealed overall housing of the energy store 2 as a result.

Figure 4:
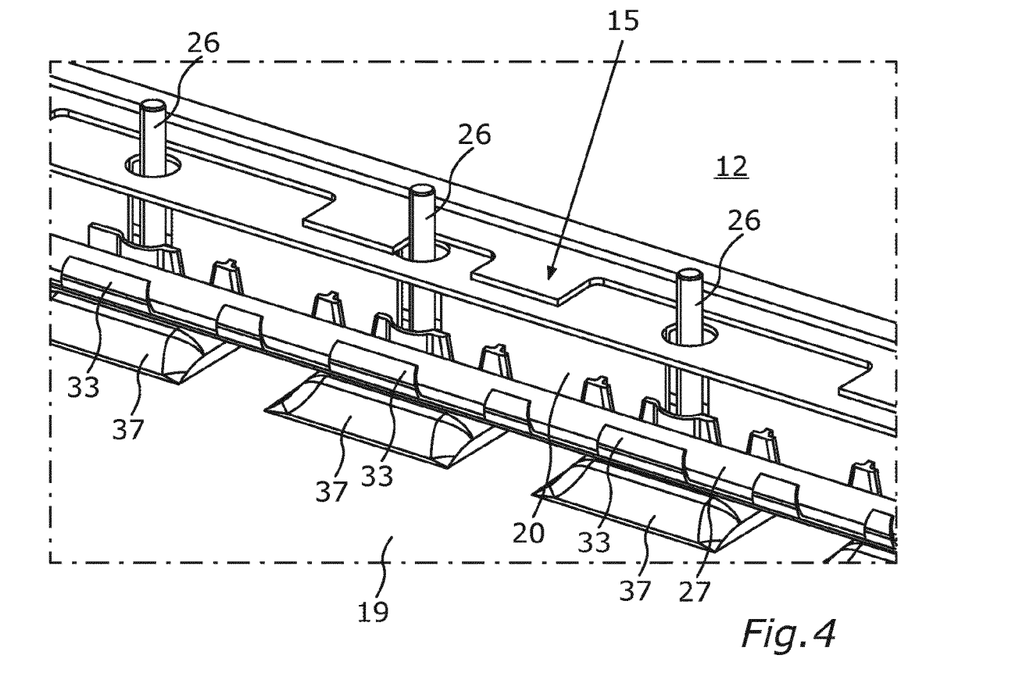
FIG. 4 shows details of a perspective view of the bottom panel with a clamping strip, via which an associated individual housing for receiving battery modules can be clamped fixedly via a retaining profile on the lower side of the vehicle floor, a continuous line duct for receiving the line being arranged along the clamping strip.

FIG. 4 shows details of a perspective view of the bottom panel 19 with the clamping strip 20, via which the respective individual housing 12 is clamped fixedly in the region of its flange connection 15 to the retaining profile 17. It can be seen here, in particular, that the flange connection 15 of the upper and lower parts 13, 14 is correspondingly omitted in the region of the respective screw connections 26.

Figure 5:
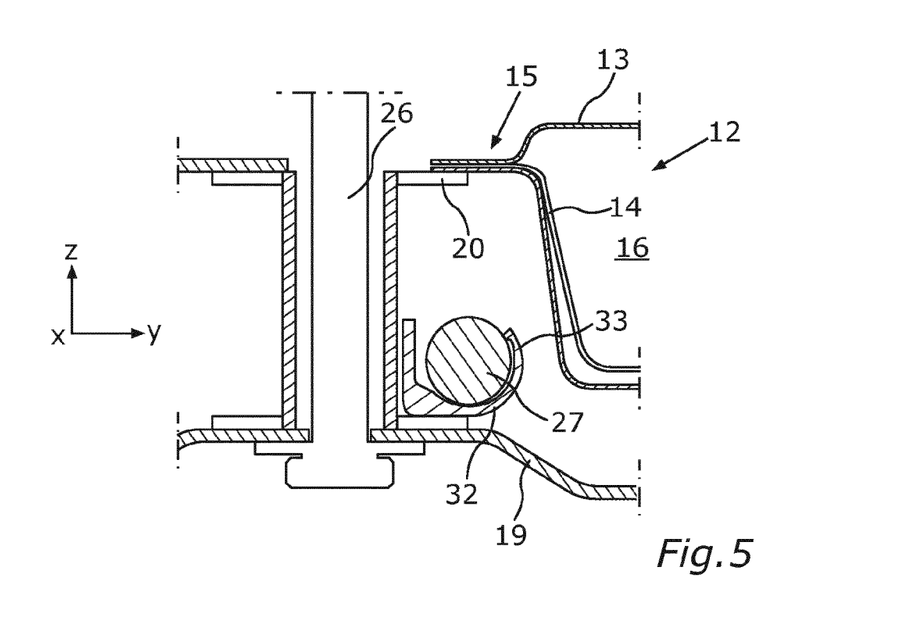
FIG. 5 shows details of a sectional view along the sectional plane, running in the vehicle vertical direction and in the vehicle transverse direction, through the bottom panel with the clamping strip, the individual housing and the line duct with the line according to FIG. 4.
Figure 6:
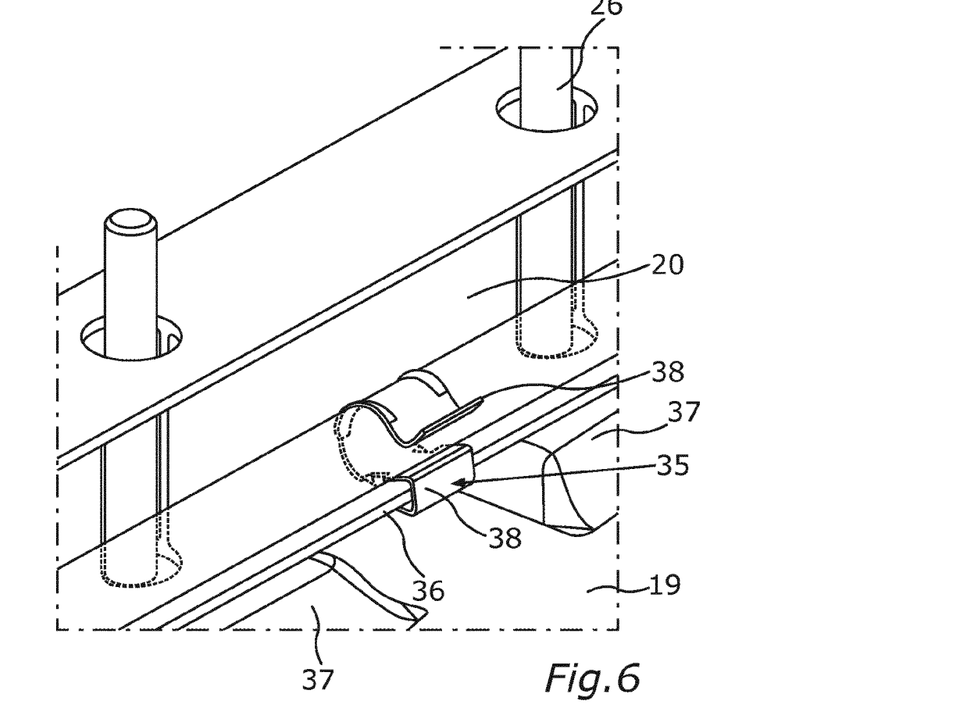
FIG. 6 shows details of a perspective view of the bottom panel with the clamping strip, along which holders which are spaced apart from one another for receiving the line are arranged.
Figure 7:
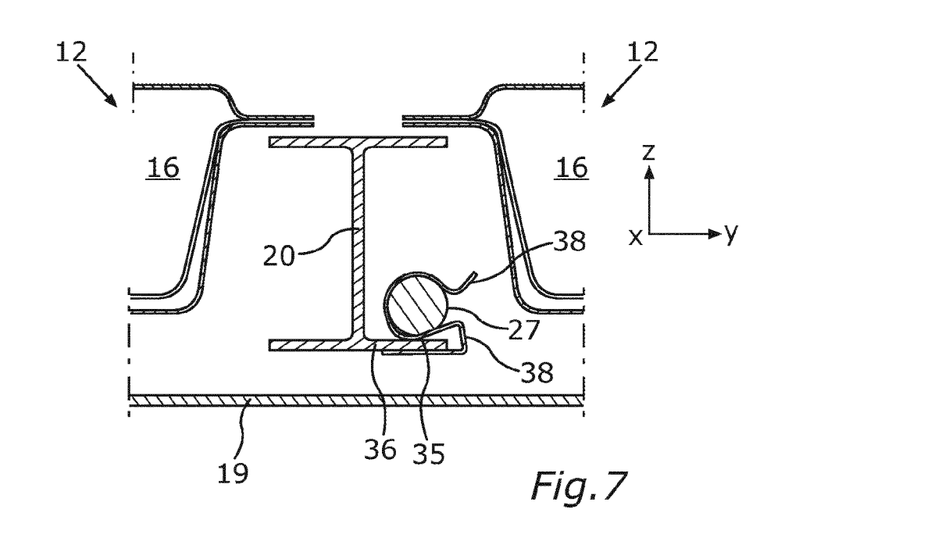
FIG. 7 shows details of a sectional view along the sectional plane, running in the vehicle vertical direction and in the vehicle transverse direction, through the bottom panel with the clamping strip, the individual housing and one of the holders of the line according to FIG. 6.
Figure 8:
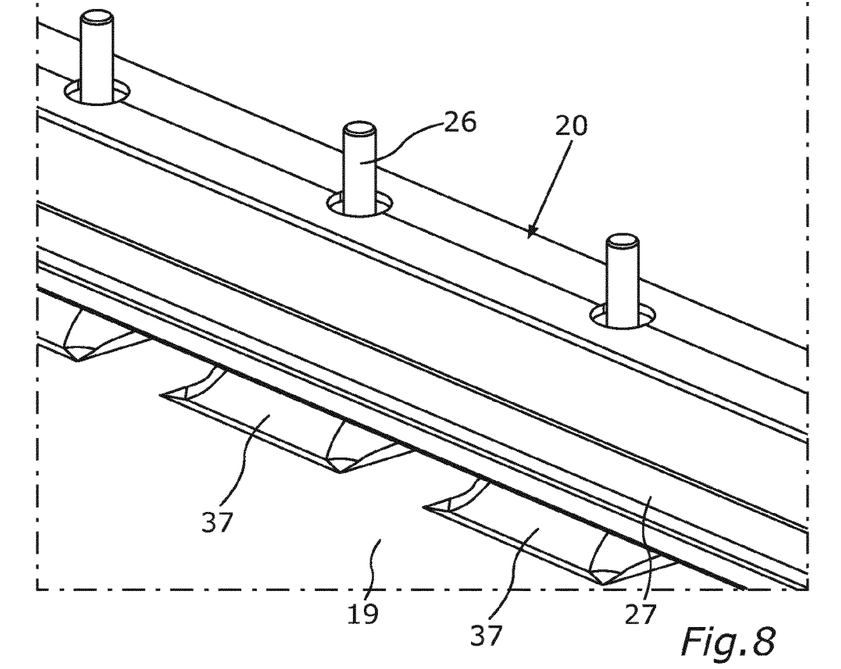
FIG. 8 shows details of a further perspective view of the bottom panel with a clamping strip of alternative configuration, into which the continuous line duct is integrated.
Figure 9:
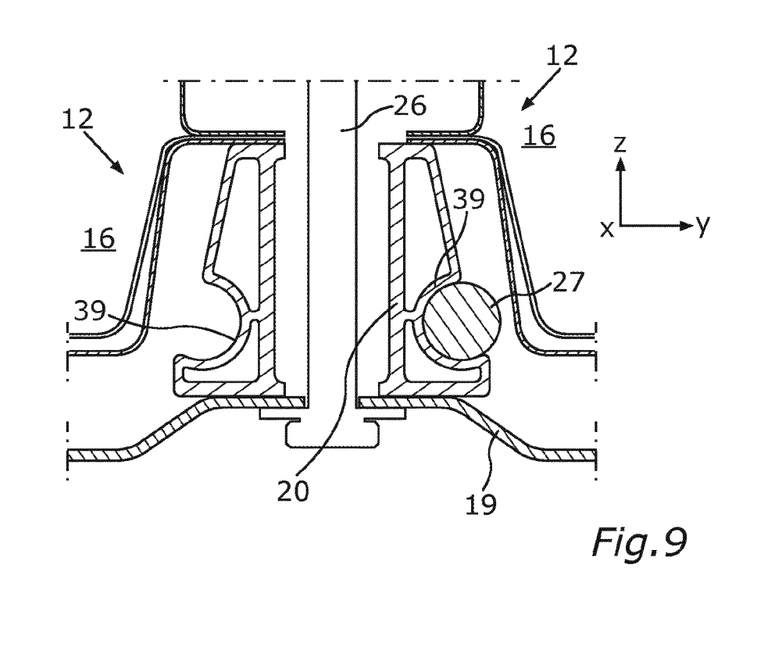
FIG. 9 shows details of a sectional view along the sectional plane, running in the vehicle vertical direction and in the vehicle transverse direction, through the bottom panel with the clamping strip and the individual housing according to FIG. 8.

In combination with FIG. 5 which shows details of a sectional view along a sectional plane which runs in the vehicle transverse direction (Y-direction) and in the vehicle vertical direction (Z-direction) of the clamping arrangement of the flange connection 15 to the clamping strip 20 and the bottom panel 19 in the case of an omitted retaining profile 17, it can be seen that at least one line 27 is arranged within the energy store 2. This line 27 (in the present case, for example, a high voltage line) runs, for example, between a front and a rear end 28, 29 (FIG. 1) of the energy store 2 and penetrates, for example, a front and a rear edge 30, 31 (FIG. 1) of the bottom panel 19. Moreover, if the bottom panel 19 and the energy store 20 directly adjoin the crossmembers 8, 11, the line can penetrate respective openings to this region.

As can now be seen in combination from FIGS. 4 and 5, a continuous line duct 32 is provided in order to route and secure the line 27, which line duct 32 is fastened, for example, to the upper side of the bottom panel 19. Here, the line duct 32 has a number of retaining elements 33 which engage around the line 27 on both sides in a finger-like manner, are then adapted into the radius of the line 27, and engage around the line 27 by somewhat more than 180 degrees, with the result that the line 27 is correspondingly fixed in a positively locking manner. In order for it to be possible here for the line 27 to be fastened favorably to the line duct 32 or the retaining elements 33, this line duct 32 is produced, for example, from an elastically flexible plastic or a metal sheet. Moreover, it can be seen from FIG. 5 that the respective screw connections 26 can be surrounded by sleeve elements 34.

In an analogous manner to FIGS. 4 and 5, FIGS. 6 and 7 show details of a further perspective view or sectional view along the sectional plane which runs in the vehicle transverse direction (Y-direction) and in the vehicle vertical direction (Z-direction) of a further possibility for fixing the line 27 which also extends in the present case along the corresponding clamping strip 20 and between two adjacent individual housings 12. In the present case, however, a plurality of holders 35 which are spaced apart from one another are provided, which holders 35 are plugged onto a corresponding strap 36 of the clamping strip 20. Here, the clamping strip 20 is supported on corresponding beads 37 of the bottom panel 19, the respective holder 35 being positioned in the region between two beads 37 of this type. As can be seen from FIG. 7, the respective holder 35 engages around the outer peripheral side of the line 27 by more than 180 degrees, and has corresponding insertion bevels 38, via which the lines can be fixed simply on the holder 35 which is once again resiliently flexible. The beads 37 serve for the concealed arrangement of a respective head of the screw connection 26.

Analogously to FIGS. 4 and 5, FIGS. 8 and 9 finally show details of a perspective view and a sectional view along the sectional plane which runs in the vehicle transverse direction (Y-direction) and in the vehicle vertical direction (Z-direction). In the present case, in contrast to the illustration according to FIGS. 4 and 5, that clamping strip 20 is shown which delimits the energy store 2 laterally and/or is arranged on the outer side of the respective last individual housing 12 laterally. Since this clamping strip is of carrier-like or profile-like design, it has respective line ducts 39 in the region of its side walls, within which line ducts 39 the corresponding line 27 is laid. In the present case, the respective line duct 39 is of substantially channel-like configuration with an arcuate cross section of somewhat more than 180 degrees, and is adapted to the outer circumference of the line 27. Therefore, the respective line 27 can also be latched simply in the channel or in the line duct 39.

LIST OF DESIGNATIONS

1 Floor assembly
2 Energy store
3 Vehicle floor
4 Side sill
5 Side sill
6 Wheel arch
7 Wheel arch
8 Crossmember
9 Bulkhead
10 Door pillar
11 Crossmember
12 Housing
13 Upper part
14 Lower part
15 Flange connection
16 Battery module
17 Retaining profile
18 Flange
19 Bottom panel
20 Clamping strip
22 Crossmember
24 Crossmember
25 Clearance
26 Screw connections
27 Line
28 Front end
29 Rear end
30 Front edge
31 Rear edge
32 Line duct
33 Retaining elements
34 Sleeve element
35 Holder
36 Lower strap
37 Beads
38 Insertion bevel
39 Line duct

What is claimed is:

1. An energy store for a motor vehicle, comprising:
a bottom panel, by way of which bottom panel respective battery modules are supported at least indirectly, and by way of which bottom panel the energy store is delimited toward a bottom; and
at least one line of the energy store runs above the bottom panel, exits from the energy store at a front and a rear end, and penetrates an opening in at least one crossmember adjoined to the bottom panel and energy store.

2. The energy store according to claim 1, wherein the energy store is delimited toward a top by way of a vehicle floor and at the front and rear end by way of respective crossmembers.

3. The energy store according to claim 2, wherein the energy store is assigned at least one additional longitudinal carrier or crossmember which is arranged on an upper side of the vehicle floor for reinforcement of the floor assembly.

4. The energy store according to claim 2, further comprising:
at least one individual housing for respective battery modules, wherein individual housing is non-load-bearing, and
the individual housing is supported by the bottom panel.

5. The energy store according to claim 4, wherein a plurality of said individual housings extend parallel to one another.

6. The energy store according to claim 4, further comprising:
in each case, one retaining profile arranged on the lower side of the vehicle floor to the side of the respective individual housing, via which retaining profile the respective housing is connected to the vehicle floor.

7. The energy store according to claim 6, wherein the respective housing is clamped between the respective retaining profile and the bottom panel via a clamping strip.

8. The energy store according to claim 1, wherein the line is received in a continuous line duct.

9. The energy store according to claim 1, wherein the line is received on holders which are spaced apart from one another.

10. The energy store according to claim 1, wherein the line is fastened at least indirectly to the bottom panel.

* * * * *